Dec. 24, 1957

P. T. HERZIG 2,817,337

FILTERING DEVICE FOR THE INNOCUOUS PREPARATION
OF INJECTABLE SOLUTIONS

Filed Nov. 12, 1953

INVENTOR
PABLO T. HERZIG
BY

United States Patent Office 2,817,337
Patented Dec. 24, 1957

2,817,337

FILTERING DEVICE FOR THE INNOCUOUS PREPARATION OF INJECTABLE SOLUTIONS

Pablo T. Herzig, Mexico City, Mexico

Application November 12, 1953, Serial No. 391,693

1 Claim. (Cl. 128—272)

The present invention relates, in general, to devices for medical or surgical use, and concerns especially the preparation of injectable solutions. More particularly it refers to a useful, new, and very practical filtering device or attachment for the innocuous preparation of injectable solutions, for instance cases in which it is necessary or convenient to prepare the solution at the very moment of its use or application.

The object of the device of my invention is to eliminate the insoluble particles (dust, fibers, particles, etc.) from injectable solutions, the moment the active principle in solution is transferred to the hypodermic syringe. This device is adapted to the cover of the bottle or vial in which the solution is prepared by means of a small tube conveniently secured to a special form provided for the lower portion of said cover.

The device or attachment of the invention is necessary when certain injectable solutions are prepared, due to the fact that some medicinal products are not stable when in solution, and therefore their effectiveness cannot be guaranteed. Notwithstanding, these products retain their stability perfectly for an indefinite time, when in solid form. In those medicinal products which are unstable when in solution, and whose hypodermic application is preferred, it is recommended that the dissolution be carried out the moment the active principle is to be applied. Due to the fact that such medicinal products are prepared in industrial form, certain insoluble and foreign substances such as dust, certain fibers or fiber filaments, small diverse particles, etc., cannot be completely and absolutely eliminated. The present filtering device for the innocuous preparation of injectable solutions has for its object the complete elimination of such insoluble and foreign substances upon preparing the solution, there being obtained a solution which corresponds to the properties of the injectable products.

These and other details, characteristics and objects of my invention will become clearly apparent in the course of the following description, as also in the drawings attached in illustration thereof, the same reference numbers being employed to indicate like parts in the six figures shown.

In said drawings:

Fig. 1 is an elevational view, as are all the rest, of a bottle containing the medicinal substance or product in solid form, and within which the solution is prepared by perforating the rubber cover with the syringe needle, said bottle being shown provided with the small tube and filtering device of the invention, and being completely covered with the rubber stopper and its metallic cover.

Fig. 2 only shows an elevation in longitudinal section, of the filtering device, which is adapted to the rubber cover which is also illustrated in the cut.

Figure 1:
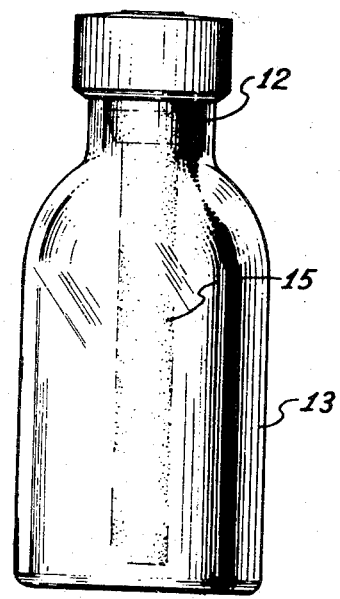

Before describing in detail the present filtering device or attachment for the preparation of injectable solutions, it should be clearly understood that the drawings illustrate certain preferred forms of practicing the invention, by way of example, or in an enunciative but not limitative form, but not limiting the invention to the specific details illustrated in the drawings, and hereinafter described. Therefore recourse can be had to certain adaptations or modifications of a secondary nature, without departing from the principles and sphere of the invention, and always within the scope of the appended claims.

As can be clearly appreciated in the drawings, the invention consists substantially in providing a perforable stopper 10, generally made of rubber, and which is provided with a lower projection 11, which is adapted to the interior of neck 12 of the bottle or receptacle 13, in order to cover it. Portion 11 has a tubular cavity 14, into which the upper extremity of a small tube 15 is adapted and telescoped; said small tube being made of filtering material and being closed at its lower extremity as shown at 16. In this way, when the medicinal substance or product whose solution should be prepared the moment it is going to be used, in order to preserve integrally its active principle or principles, has been packed into the bottle or vial 13, stopper 10 is perforated with a needle attached to a syringe containing the distilled water, a physiologic saline solution, etc. with which said solution is prepared, said fluid reaching the solid medicinal product through filtering tube 15, and dissolving said product. Thereafter, when it is perfectly dissolved, the solution is withdrawn, using the same needle and syringe, so that when the solution passes through filter 15, any insoluble substances or foreign bodies such as the aforesaid, are detained by it, and a perfectly filtered and clean solution is injected.

Figures 2, 3:
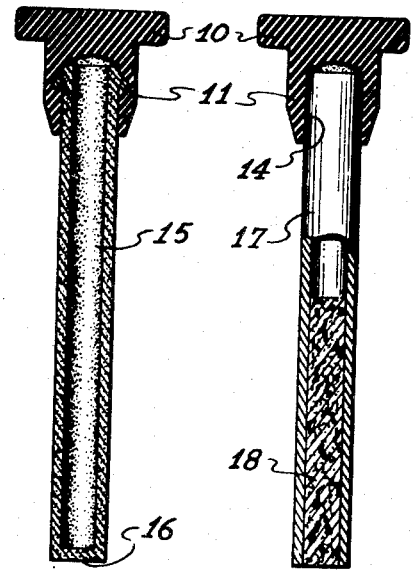
Fig. 3 is also an elevation of another embodiment of the filtering device adapted to the same cover, in which a small tube of non-filtering material is partially filled with the filter or filtering material, properly speaking.

Fig. 3 of the adjoining drawings illustrates an embodiment of the invention, in which the small tube 15 made completely out of filtering material, and having a closed lower end 16, is substituted by a small tube 17, made out of glass, synthetic resin, or any non-filtering material, into whose lower end an obturation 18 made of filtering material, is introduced.

Figure 4:
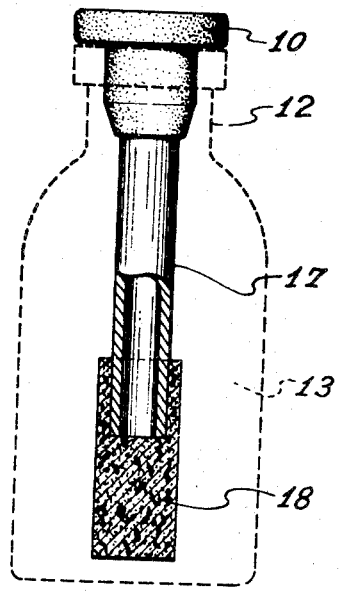
Fig. 4 shows an elevation of another embodiment of the aforesaid filtering attachment adapted to the rubber cover, in which embodiment an obturating body of filtering material is adapted to the extremity of the small non-filtering tube. The broken lines indicate the outline of the bottle which contains the medicinal product.
Figures 5, 6:
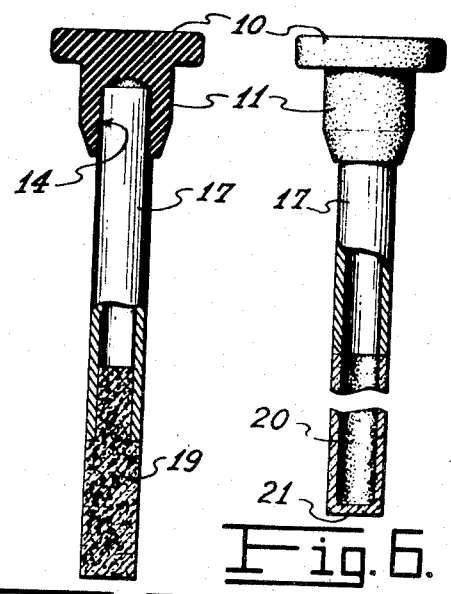
Fig. 5 shows still another embodiment of the filtering device, in which an oblong cover of filtering material is adapted to the interior of the extremity of the small tube made of non-filtering material.
Fig. 6 shows a further form of the same device of my invention, in which a certain portion of the body of the small tube is prolonged as a small tube made of filtering material, closed at its lower extremity.

Figs. 4, 5, and 6 of the same drawings illustrate three embodiments of the same invention, in which the same small tube 17 made of non-filtering material, is obturated at its lower end, by means of an attachment or filtering stopper. For example, Fig. 4 shows the small tube 17 with its lower end covered with a body 18 made of filtering material, which prolongs tube 17 and is adapted to its exterior.

In Fig. 5, a prolongation or cylindrical body made of filtering material is adapted to the lower end of the non-filtering small tube 17, being secured internally thereto.

In Fig. 6 the tubular non-filtering body 17 continues downwardly, along a certain length of its lower portion, by means of a filtering small tube 20, which is closed at its end 21.

All these embodiments do not alter the basic principle of the invention, which is a device designed for eliminating insoluble or foreign particles from injectable solutions, the moment the active principle or injectable solution is transferred from the vial to the syringe.

Having thus particularly described the invention, what I consider as new and desire to secure by Letters Patent is as follows:

A device for stoppers of receptacles containing medicinal solution, comprising a tubular element open at one end and closed at the other, and means for securing the open end of said element to the stopper so that the element forms a closed chamber and constitutes a prolongation of the stopper when placed in the receptacle, at least a portion of the walls of said tubular element being molded of filtering material to pass liquid between the closed chamber and the receptacle so that the liquid may be injected or withdrawn by a syringe needle inserted through the stopper, said securing means including a flange at the upper open end of said tubular element and closely engaging the interior of the stopper, said flange being inclined away from said open end to facilitate insertion into and resist withdrawal from the stopper.

References Cited in the file of this patent

UNITED STATES PATENTS

| | | |
|---|---|---|
| 2,222,123 | Schwab | Nov. 19, 1940 |
| 2,558,987 | Shaw | July 3, 1951 |
| 2,612,160 | Barr | Sept. 30, 1952 |